United States Patent [19]
Chien

[11] Patent Number: 5,474,404
[45] Date of Patent: Dec. 12, 1995

[54] FOLDABLE PLAYPEN RAIL ASSEMBLY

[75] Inventor: Jui-Lung Chien, Taichung, Taiwan

[73] Assignee: Jina Manufacturer Thai Co., Ltd., Bangkok, THX

[21] Appl. No.: 294,316

[22] Filed: Aug. 23, 1994

[51] Int. Cl.⁶ .................................................. F16C 11/10
[52] U.S. Cl. ........................ 403/102; 403/100; 403/117; 403/325; 5/98.1; 5/98.3; 5/99.1
[58] Field of Search .................... 403/102, 101, 403/100, 91, 84, 117, 325, 321; 5/99.1, 98.1, 98.3; 256/26, 25

[56] References Cited

U.S. PATENT DOCUMENTS

| | | | |
|---|---|---|---|
| 4,365,908 | 12/1982 | Thiboutot | 403/102 |
| 4,499,619 | 2/1985 | Kassai | 5/98.3 X |
| 4,614,454 | 9/1986 | Kassai | 403/102 X |
| 4,811,437 | 3/1989 | Dillner et al. | 5/99.1 |
| 5,211,498 | 5/1993 | Huang | 5/99.1 X |
| 5,239,714 | 8/1993 | Huang | 5/99.1 |
| 5,293,656 | 3/1994 | Chan | 5/99.1 |
| 5,353,451 | 10/1994 | Hsiung | 5/99.1 |
| 5,358,220 | 10/1994 | Yu-Kuang | 256/25 |

*Primary Examiner*—Eric K. Nicholson
*Assistant Examiner*—Harry C. Kim
*Attorney, Agent, or Firm*—Ralph F. Crandell; Holland & Hart

[57] ABSTRACT

A foldable rail assembly includes a first shell including a first wall defining a cutout and two apertures, a second wall defining two apertures and a top formed between the first and second walls. A second shell includes a first wall defining two apertures and a passage, a second wall defining two apertures and a top formed between the first and second walls thereof. A lock defines two apertures and includes an upper portion and a lower portion of a greater length thus defining two shoulders. Two pins are inserted through the apertures defined in the first and second shells and the lock. Three springs are compressed between the lock and the second wall of the second shell. Two rails are pivotally linked to the first shell and each include an end with a block raised therefrom. The blocks are supported by the shoulders when the lock is against the first wall of the second shell. The blocks are not supported by the shoulders when the lock is moved against the second wall of the second shell through the cutout defined in the first wall of the first shell and the passage defined in the first wall of second shell.

6 Claims, 4 Drawing Sheets

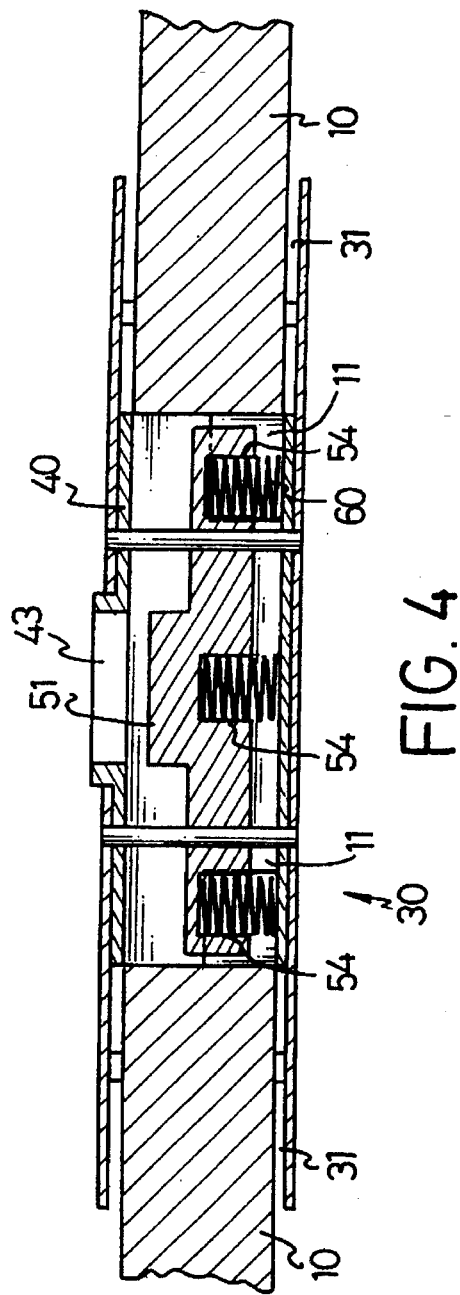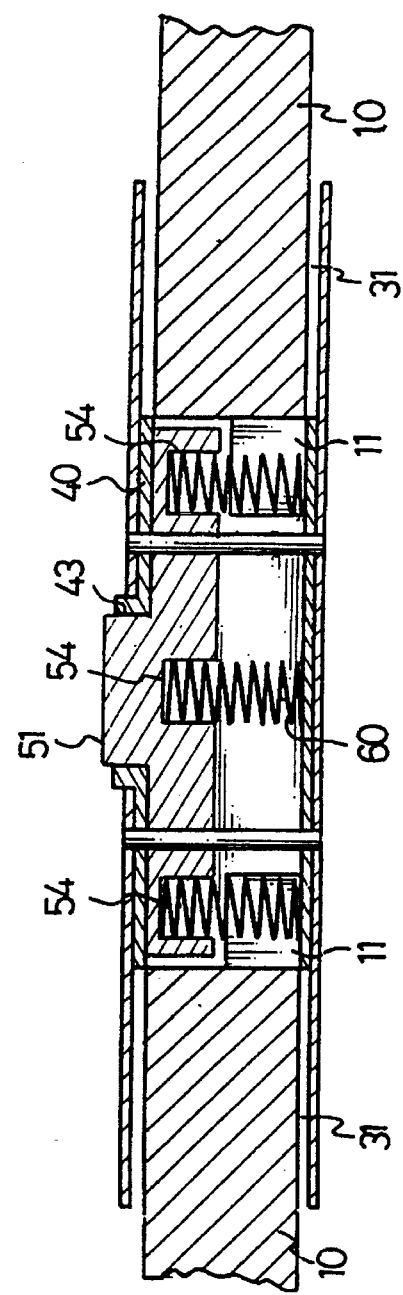

FOLDABLE PLAYPEN RAIL ASSEMBLY

BACKGROUND OF THE INVENTION

The present invention relates to a playpen structure and particularly to a foldable rail assembly.

There have been various foldable playpens including foldable rail assemblies. Generally, such a foldable rail assembly includes a joint and two rails. The rails are pivotally linked to each other by means of the joint. To lock the rails in an extended position, a spring-biased latch is insertable through an aperture defined in each of the rails and one of two apertures defined in the joint. However, the spring-biased latch provides insufficient strength for retaining the rails in the extended position.

SUMMARY OF THE INVENTION

It is the primary objective of this invention to provide a strong foldable rail assembly.

The primary objective of this invention is achieved by providing a foldable rail assembly including a first shell including a first wall defining a cutout and two apertures, a second wall defining two apertures and a top formed between the first and second walls. A second shell includes a first wall defining two apertures and a passage, a second wall defining two apertures and a top formed between the first and second walls thereof. A lock defines two apertures and includes an upper portion and a lower portion of a greater length thus forming two shoulders. Two pins are inserted through the apertures defined in the first and second shells and the lock. Three springs are compressed between the lock and the second wall of the second shell. Two rails are pivotally linked to the first shell and each includes an end with a block raised therefrom. The blocks are supported by the shoulders when the lock is against the first wall of the second shell. The blocks are not supported by the shoulders when the lock is moved against the second wall of the second shell through the cutout defined in the first wall of the first shell and the passage defined in the first wall of second shell.

BRIEF DESCRIPTION OF THE DRAWINGS

FIG. 4 is a bottom view of a playpen rail joint in a locked position in accordance with the preferred embodiment of this invention; and FIG. 5 is a cross-sectional view of a joint connecting two playpen rails with each other according to the preferred embodiment of this invention.

DETAILED DESCRIPTION OF THE PREFERRED EMBODIMENT

Figure 1:
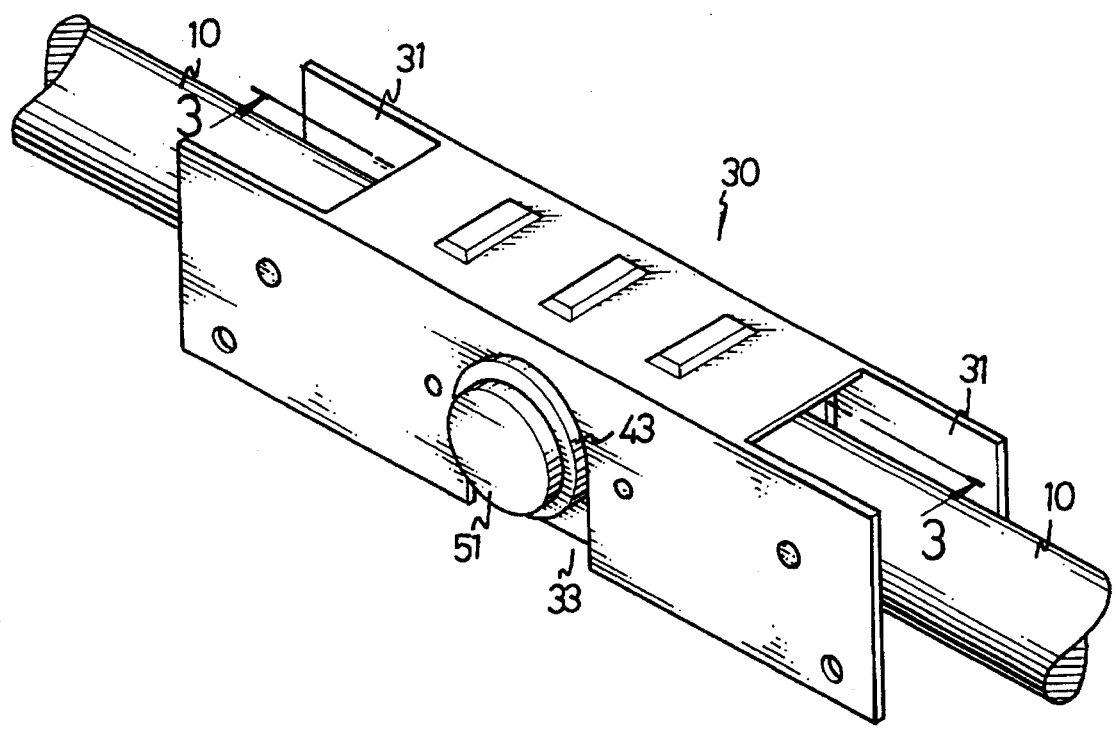
FIG. 1 is an isometric view of a joint connecting two playpen rails with each other according to the preferred embodiment of this invention.

FIG. 1 shows two playpen rails 10 linked to each other by means of a joint according to the preferred embodiment of this invention.

Figure 2:
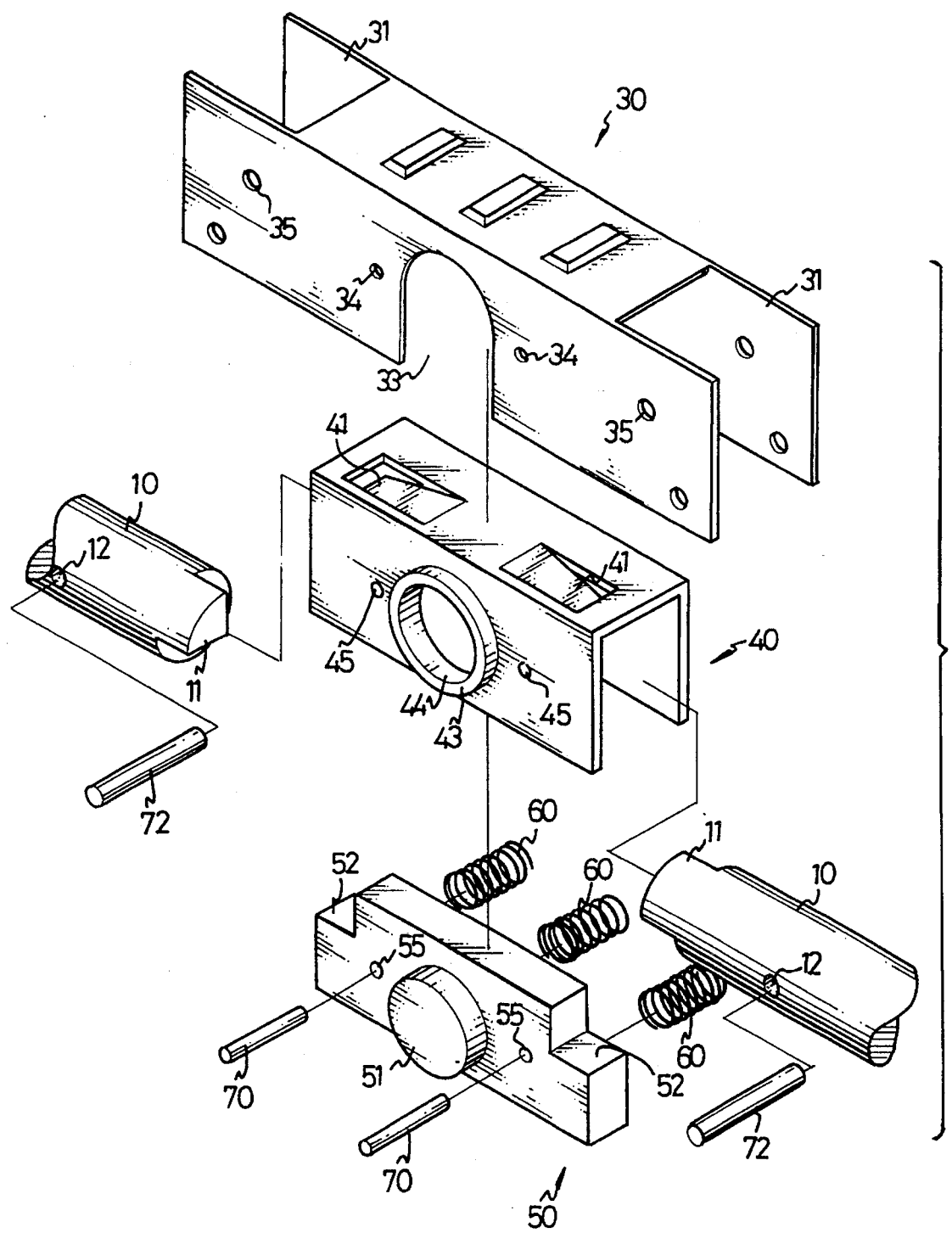
FIG. 2 is an exploded view of a joint connecting two playpen rails with each other according to the preferred embodiment of this invention.

Referring to FIG. 2, each of the rails 10 includes a quadrant block 11 longitudinally protruding therefrom. A passage 12 is transversely defined through the rail 10.

The joint includes a first shell 30 including two walls and a top formed between the walls. The length of the top of the first shell 30 is shorter than the length of the walls of the first shell 30 thus defining two recesses 31 between the walls at two ends of the top. A cutout 33 is defined in one of the walls of the first shell 30. Two apertures 34 are defined in each of the walls of the first shell 30. The cutout 33 is located between the apertures 34. Two apertures 35 are defined in each of the walls of the first shell 30 near the recesses 31.

The joint includes a second shell 40 including two walls and a top formed between the two walls. Two press-outs are defined in the top of the second shell 40 thus forming two leaf springs 41. A tubular portion 43 is raised from one of the walls of the second shell 40 thus defining a passage 44. Each of the walls of the second shell 40 defines two apertures 45 corresponding to the apertures 34.

The joint includes a lock 50 which is substantially a plate with a thickness slightly smaller than a radius of the rails 10. A button 51 is raised from a first lateral surface of the lock 50. Three recesses 54 (see FIGS. 4 and 5) are defined in a second lateral surface of the lock 50. The lock 50 includes an upper portion and a lower section. The length of the upper portion of the lock 50 is smaller than the length of the lower portion of the lock 50 thus forming two shoulders 52. The lock 50 defines the two apertures 55 corresponding to the apertures 34 and 45.

Three helical springs 60 are received in the recesses 54. The lock 50 is disposed between the walls of the second shell 40 so that the button 51 is slidable received in the passage 44 and that the helical springs 60 are compressed between the lock 50 and one of the walls of the second shell 40. The second shell 40 is received in the first shell 30 so that the tubular portion 43 is received in the cutout 33. Two pins 70 are inserted through the apertures 34, 45 and 55 so as to combine the first shell 30, the second shell 40 and the lock 50. Two pins 72 are inserted through the apertures 35 and the passages 12 so as to combine the first shell 30 and the rails 10. The blocks 11 are disposed on the shoulders 52.

Figure 3:
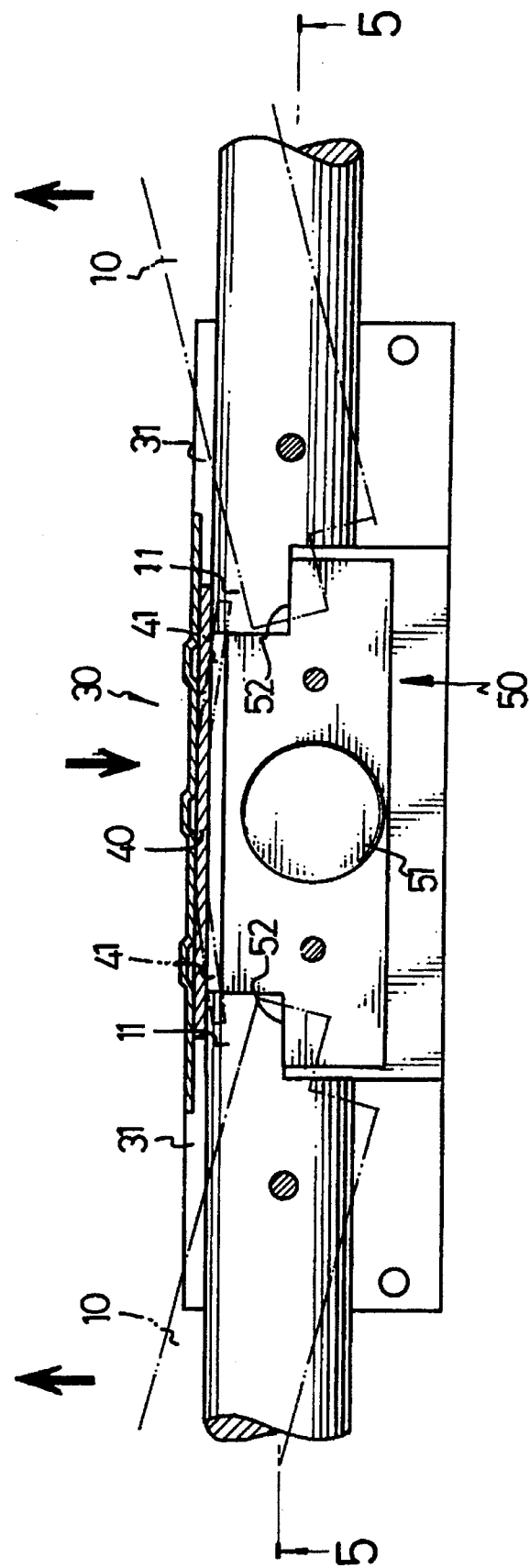
FIG. 3 is a bottom view of a playpen rail joint in an unlocked position according to the preferred embodiment of this invention.

Referring to FIG. 3, the lock 50 is biased against the wall on which the tubular portion 43 is formed. The blocks 11 are biased against the shoulders 52 by means of the leaf springs 41. When the rails 10 are subjected to a downward load, the blocks 11 are supported by means of the lock 50, thus retaining the rails 10 in an extended position as shown in bold lines in FIG. 5.

Referring to FIG. 4, the lock 50 is disengaged from the shoulders 52 by pressing the button 51. If the rails 10 are subjected to a downward load, the blocks 11 will not be supported by means of the lock 50, i.e., the rails 10 will be moved to a folded position as shown in phantom lines in FIG. 5.

In this invention, the shoulders 52 are engageable with the blocks 11 for retaining the rails 10 in the extended position. The shoulders 52 and the blocks 11 provide sufficient strength for retaining the rails 10 in the extended position.

What is claimed is:

1. A foldable rail assembly comprising:

a first shell including a first wall defining a cutout and two apertures, a second wall defining two apertures and a top formed between the first and second walls;

a second shell including a first wall defining two apertures and a passage, a second wall defining two apertures and a top formed between the first and second walls thereof;

a lock defining two apertures and including an upper portion and a lower portion of a greater length thus forming two shoulders;

two pins inserted through the apertures defined in the first and second shells and the lock;

at least one spring compressed between the lock and the second wall of the second shell;

two rails pivotally linked to the first shell and each including an end with a block raised therefrom;

whereby the blocks are supported by the shoulders when the lock is against the first wall of the second shell, the blocks are not supported by the shoulders when the lock is moved toward the second wall of the second shell through the cutout defined in the first wall of the first shell and the passage defined in the first wall of second shell.

2. A foldable rail assembly in accordance with claim 1 wherein the lock includes a lateral surface defining at least one recess for receiving the spring.

3. A foldable rail assembly in accordance with claim 1 wherein the top of the second shell includes two press-outs defined therein thus forming two leaf springs for biasing the ends of the rails against the lower portion of the lock.

4. A foldable rail assembly in accordance with claim 1 including two second apertures defined in each of the first and second walls of the first shell, a passage transversely defined through each of the rails, and two pins inserted through the second apertures defined in the first and second walls of the first shell and the passages transversely defined through the rails.

5. A foldable rail assembly in accordance with claim 1 including three springs.

6. A foldable rail assembly in accordance with claim 5 wherein the lock includes a lateral surface defining three recesses for receiving the springs.

* * * * *